Jan. 6, 1942.  E. KOLLAND  2,269,209
DOUBLE-WALLED COMPARTMENT FOR HIGH ALTITUDE AIRCRAFT
Filed Nov. 7, 1938
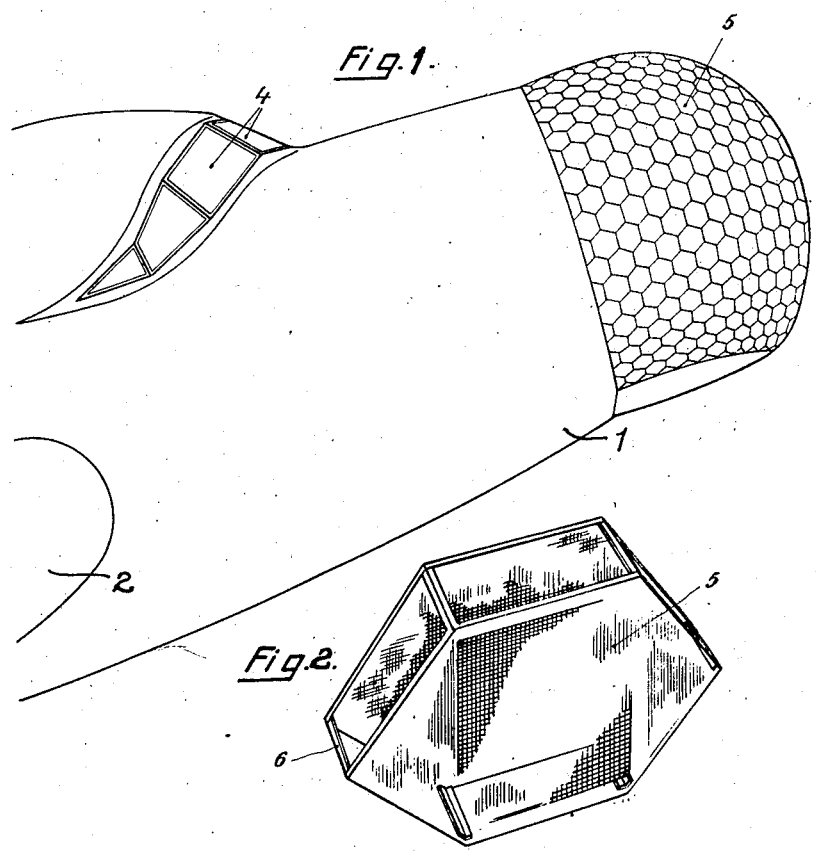

Patented Jan. 6, 1942

2,269,209

UNITED STATES PATENT OFFICE 2,269,209

DOUBLE-WALLED COMPARTMENT FOR HIGH ALTITUDE AIRCRAFT

Emil Kolland, Berlin-Johannisthal, Germany, assignor to the firm: Henschel Flugzeug-Werke A. G., Schonefeld, Kreis Teltow, Germany Application November 7, 1938, Serial No. 239,383
In Germany November 15, 1937

1 Claim. (Cl. 244—119)

The present invention relates to improvements in double-walled compartments for high altitude aircraft.

In aircraft to be flown at high altitudes it is necessary to provide the compartments used by the crew and the passengers with an internal pressure which corresponds approximately to atmospheric pressure at the surface of the earth. These compartments have thus been provided with double walls in order to obtain by means of such walls and accessory parts used for stiffening the walls, greater security for the inmates of the aircraft. Moreover the hollow space enables a pressure to be maintained inside the compartment which differs from the pressure on the outside, and it also provides means for adequate heating of the compartment. For the purpose of looking out and the admission of light, small circular windows with double panes have been proposed, which are fitted to the two walls of the compartment. Owing to their small area, however, these windows fulfil their purpose only to an insufficient extent.

If windows are used which have a comparatively large area and these windows are adapted to the stream-line shape of the compartment, strongly arched windows have to be used in places, and as double panes are required for their construction, refraction of the light occurs to such an extent, that the inmate of the aircraft obtains only a blurred and distorted impression of the objects outside.

According to the invention the above inconvenience is avoided by forming the parts of the walls which are permeable to light or preferably transparent and of comparatively large area, of a large number of hexagonal flat double panes of such size and so arranged, that the composite fields form a section of the wall which is substantially in alignment with the stream-line shape of the compartment. The hexagonal form serves to reduce the optically obtuse surfaces within the transparent area of the wall section to a minimum. The hexagonal double panes are preferably made as a uniform structural unit for composing the window, so that a unit of the composite window can readily be replaced. One mode of execution of the invention is shown by way of example in the accompanying drawing:

Figure 1 shows a light permeable wall section for the pilot's compartment and at the front end of this compartment an enclosure consisting of a large number of hexagonal panes, and Figure 2 shows an individual double-paned hexagonal unit of the kind used in Figure 1.

In these figures 1 indicates a part of the compartment of a high altitude aircraft, 2 part of the wing, and 4 a row of windows of the pilot's cabin.

The approximately stream-line shape of the light permeable or transparent wall part of the compartment 1 is obtained in a particularly satisfactory manner by the use of hexagonal double panes 5, panes 5 being used in a suitable size. These hexagonal double panes 5 may be assembled by means of a frame 6 to form a uniform structural unit, as shown in Figure 2. These units may be made to be exchangeable.

The use of the present invention does not prevent the provision of means for opening and closing the windows.

What I claim and desire to secure by Letters Patent of the United States is:

Double-walled compartment for high altitude aircraft having a heatable hollow space in the compartment wall, a portion of said wall being arched in streamline fashion and forming a full-view pilot's compartment of transparent or light permeable material, said latter wall portion of the pilot's compartment being composed of a plurality of flat hexagonal double panes forming multiple fields which are so constituted that they form uniform structural units which can readily be exchanged.

EMIL KOLLAND.